(12) United States Patent
Hamaya et al.

(10) Patent No.: US 8,381,859 B2
(45) Date of Patent: Feb. 26, 2013

(54) INVERTED PENDULUM TYPE VEHICLE

(75) Inventors: Kazushi Hamaya, Saitama (JP); Hironori Waita, Saitama (JP); Hiroshi Gomi, Saitama (JP); Joonheon Shin, Saitama (JP); Kazushi Akimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/496,487

(22) PCT Filed: Sep. 18, 2009

(86) PCT No.: PCT/JP2009/004721
§ 371 (c)(1),
(2), (4) Date: Mar. 15, 2012

(87) PCT Pub. No.: WO2011/033574
PCT Pub. Date: Mar. 24, 2011

(65) Prior Publication Data
US 2012/0175176 A1 Jul. 12, 2012

(51) Int. Cl.
*B62D 61/00* (2006.01)
(52) U.S. Cl. .......................... 180/208; 180/21
(58) Field of Classification Search .............. 180/21, 180/187, 208, 218; 280/291, 293
See application file for complete search history.

(56) References Cited

U.S. PATENT DOCUMENTS

| | | | | |
|---|---|---|---|---|
| 3,260,324 A | * | 7/1966 | Suarez | 180/10 |
| 6,408,240 B1 | * | 6/2002 | Morrell et al. | 701/82 |
| 6,543,564 B1 | * | 4/2003 | Kamen et al. | 180/89.13 |
| 7,004,271 B1 | * | 2/2006 | Kamen et al. | 180/21 |
| 7,673,718 B2 | * | 3/2010 | Asai et al. | 180/208 |
| 7,783,392 B2 | * | 8/2010 | Oikawa | 701/1 |
| 7,866,429 B2 | | 1/2011 | Ishii et al. | |
| 2009/0051136 A1 | * | 2/2009 | Yamada et al. | 280/205 |
| 2010/0117426 A1 | * | 5/2010 | Strassman | 297/335 |
| 2010/0174476 A1 | * | 7/2010 | Fuwa | 701/124 |
| 2011/0209932 A1 | | 9/2011 | Takenaka et al. | |
| 2011/0303475 A1 | * | 12/2011 | Kim | 180/218 |

FOREIGN PATENT DOCUMENTS

| | | |
|---|---|---|
| JP | 2004-074814 A | 3/2004 |
| JP | 2006-001384 A | 1/2006 |
| JP | 2008-253565 A | 10/2008 |
| WO | 2008/026725 A1 | 3/2008 |
| WO | 2008/139740 A1 | 11/2008 |
| WO | 2009/054344 A1 | 4/2009 |

\* cited by examiner

*Primary Examiner* — Ruth Ilan
*Assistant Examiner* — Darlene P Condra
(74) *Attorney, Agent, or Firm* — Carrier Blackman & Associates, P.C.; Joseph P. Carrier; William D. Blackman

(57) ABSTRACT

An inverted pendulum type vehicle (1) includes a lower frame incorporated with load sensor having an input portion 60 for receiving an external force and an upper frame (3) provided with a saddle 11 for supporting a load of a rider or a cargo and a grip handle (31) for enabling a user not riding the vehicle to support the vehicle (1), the upper frame being connected to the lower frame via the input portion of the load sensor. Therefore, in the vehicle including the lower frame supporting a propelling unit for the vehicle and the upper frame detachably attached to the lower frame, by using a single force sensor, not only the force acting on a load support portion of the upper frame can be detected in an accurate manner, but also the force acting on the load support portion when the user is transporting the vehicle can be detected.

3 Claims, 6 Drawing Sheets

INVERTED PENDULUM TYPE VEHICLE

TECHNICAL FIELD

The present invention relates to an inverted pendulum type vehicle configured to be propelled by a wheel or the like.

BACKGROUND OF THE INVENTION

A known inverted pendulum type vehicle comprises a plurality of wheels actuated by an electric motor, a step for supporting the feet of a rider, an attitude control handle bar extending upright from the step and a seat for seating the rider, and the upright attitude of the vehicle is maintained by performing an inverted pendulum control on the electric motor. (See Patent document 1, for instance.)
Prior Art Document(s)
Patent Document(s)
  Patent document 1: JP 2008-253565

BRIEF SUMMARY OF THE INVENTION

Task to be Accomplished by the Invention

According to the inverted pendulum type vehicle disclosed in Patent document 1, the electric motor is controlled according to the tilt angle of the vehicle body detected by a gyro sensor or the like and the load on the vehicle body detected by a load sensor incorporated in the step. In the inverted pendulum type vehicle of this kind, it is necessary to detect a force that may be applied to the vehicle (such as an upwardly directed force which the user may apply to a part of the vehicle body when holding the vehicle) as a measure against the free rotation of the wheel.

However, if a dedicated sensor is provided in the vehicle to detect the force which the user applies to the vehicle, the structure of the vehicle is made correspondingly more complex, and this leads to the increase in the weight and cost of the vehicle. Furthermore, when the vehicle is provided with a seat, the information obtained from the load sensor incorporated in the step does not provided accurate information on the load of the rider and the shifting of the gravitational center of the vehicle.

In view of such problems of the prior art, a primary object of the present invention is to provide an inverted pendulum type vehicle that allows the load acting upon a load supporting part of the vehicle to be detected accurately by using a single force sensor, and is also able to detect the force that is applied to a support part of the vehicle that is used by a user when transporting the vehicle.
Means to Accomplish the Task To achieve such an object of the present invention, a first aspect of the present invention provides an inverted pendulum type vehicle, comprising a lower frame supporting a propelling unit for the vehicle, and an upper frame detachably connected to the lower frame, wherein: the lower frame is provided with a force sensor including an input portion for receiving an external force; and the upper frame is provided with a load supporting part for supporting a load of a rider or a cargo and a support part for enabling a user not riding the vehicle to support the inverted pendulum type vehicle, the upper frame being connected to the lower frame via the input portion of the force sensor.

According to a second aspect of the present invention, the load supporting part is moveable between a deployed position that allows the load supporting part to be used and a retracted position that does not allow the load supporting part to be used, the load supporting part at least partly covering the support part when in the deployed position.

According to a third aspect of the present invention, the support part is located above the load supporting part when the load supporting part is in the retracted position.
Effect of the Invention According to the first aspect of the present invention, because the upper frame is provided with the load supporting part and a support part, and is connected to the lower frame via the input portion of the force sensor, by using the single force sensor, not only the force (such as the load of the rider or the cargo and/or the displacement of the gravitation center caused by the rider or the like) that acts on the load supporting portion can be accurately detected but also the force that acts upon the support part when the user transports the inverted pendulum type vehicle can be detected.

According to a second aspect of the present invention, because the support part is prevented from being used by being at least partly covered by the load supporting part when the load supporting part is in the deployed position, the load applied to the force sensor is limited to that of the load acting on the load supporting part so that the accuracy in detecting the force acting on the load supporting portion can be increased, and the control of the inverted pendulum type vehicle based on the detection result of the force sensor can be performed in a favorable manner.

According to a third aspect of the present invention, because the support part is located above the load supporting part when the load supporting part is in the retracted position, the support part is located in such a manner that a user not riding the vehicle is enabled to readily grab the support part, or the support part is preferentially grabbed by the user. As a result, the load applied to the force sensor is limited to that of the load acting on the load supporting part so that the accuracy in detecting the force acting on the load supporting portion can be increased, and the control of the inverted pendulum type vehicle based on the detection result of the force sensor can be performed in a favorable manner.

DETAILED DESCRIPTION OF THE PREFERRED EMBODIMENTS

An inverted pendulum type vehicle 1 embodying the present invention is described in the following with reference to FIGS. 1 to 6. In the following description, the orientation and direction of the inverted pendulum type vehicle and components thereof are defined as indicated by the arrows representing the vertical, fore and aft and lateral directions in FIG. 1.

Figure 1:
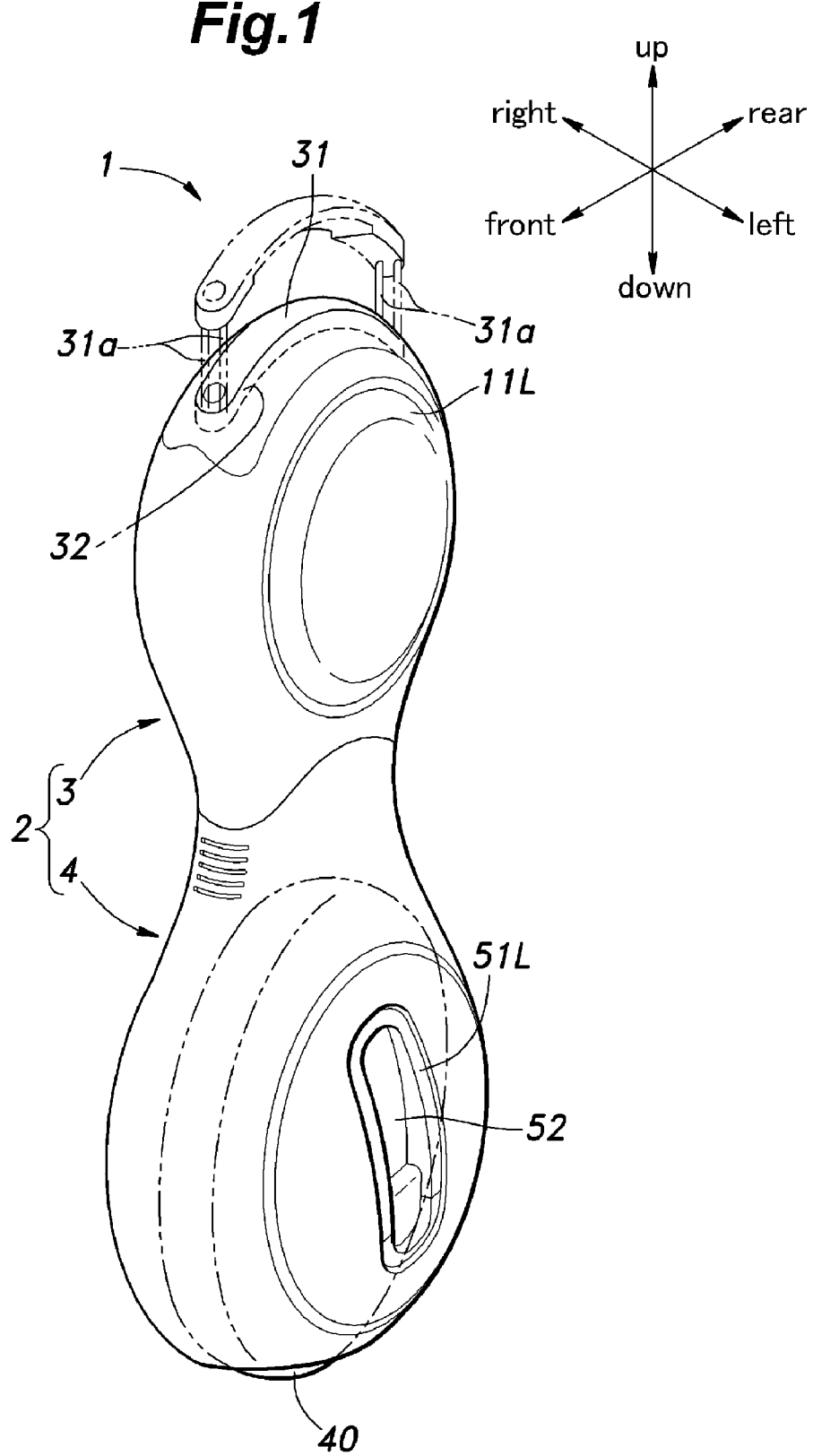
FIG. 1 is a perspective view of an inverted pendulum type vehicle embodying the present invention.

Referring to FIG. 1, the inverted pendulum type vehicle (vehicle) 1 consists of an inverted pendulum type unicycle having a housing 2 which is narrowed in a vertical middle part thereof in the shape of numeral "8" as seen from a side. The housing 1 includes an upper frame 3 and a lower frame 4 that are vertically detachably joined to each other.

Figure 2:
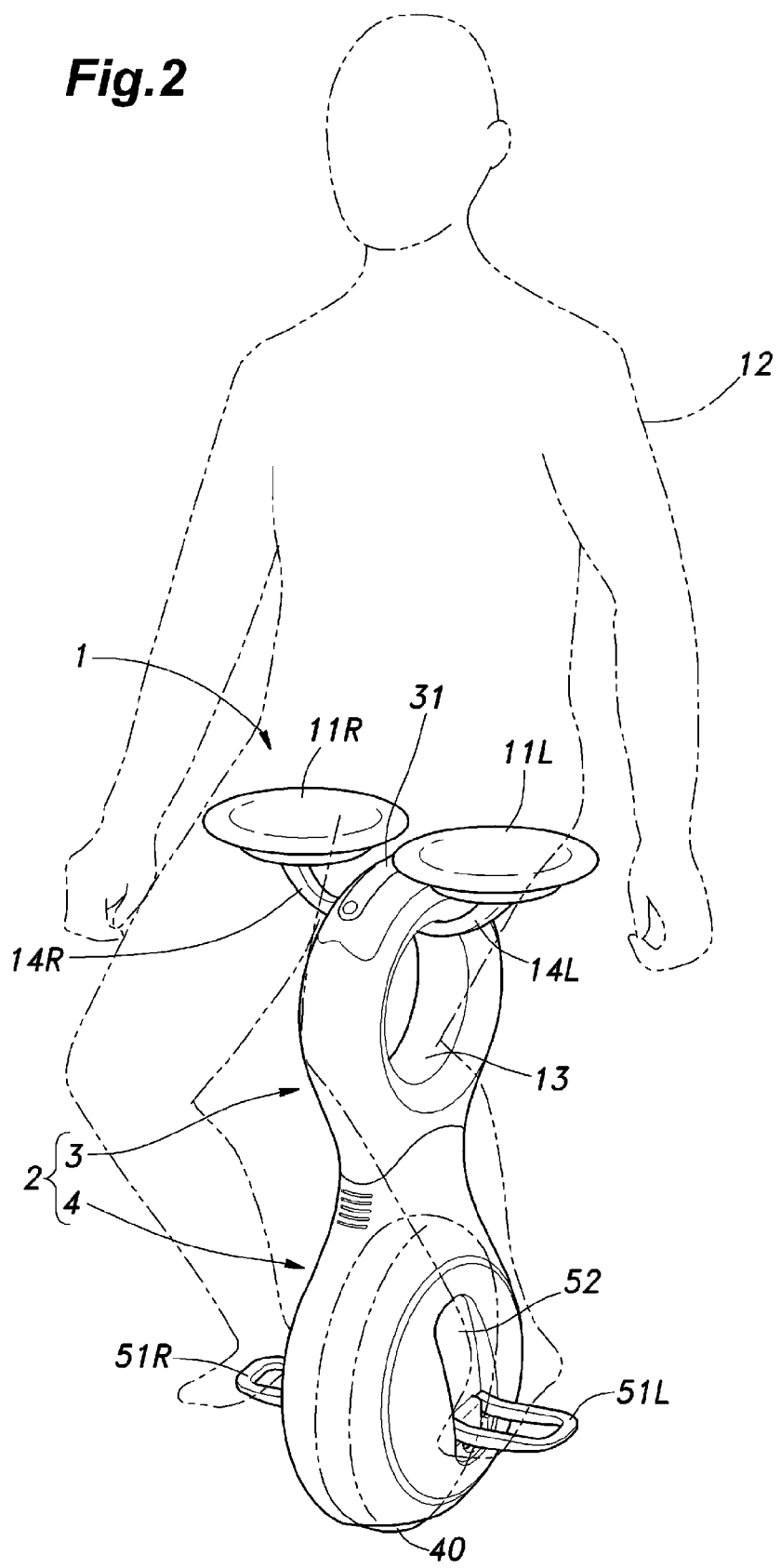
FIG. 2 is a perspective view of the inverted pendulum type vehicle (with a saddle and a step deployed) having a rider riding the vehicle.

The upper frame 3 forms the upper half of the housing 2, and is provided with a retractable saddle 11 consisting of a pair of saddle parts 11L and 11R, each consisting of a disk shaped seat, located on either side of the upper frame 3 as shown in FIG. 2. The saddle parts 11L and 11R support the load of the rider 12 by supporting the hips and thighs of the rider 12.

Each saddle part 11L, 11R is moveable between a deployed position (indicated by the double-dot chain-dot line in FIG. 3) allowing the use thereof and a retracted position (FIG. 1) not allowing the use thereof. In the retracted position, the saddle parts 11L and 11R are stored in a cylindrical saddle storage space 13 having a cylindrical shape and passed laterally across the upper frame 3.

Figure 3:
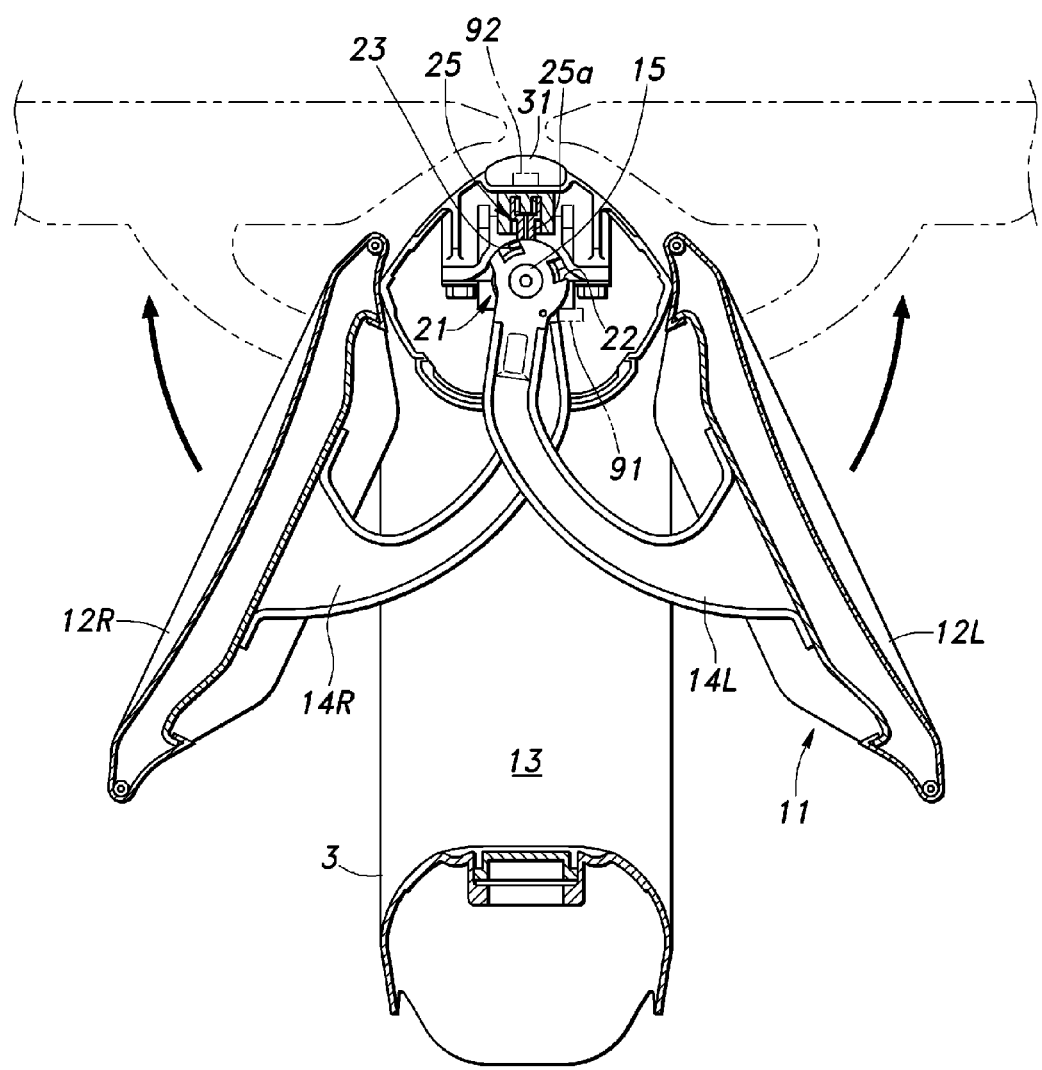
FIG. 3 is a sectional view showing the structure of the saddle of the inverted pendulum type vehicle.

As shown in FIG. 3, each saddle part 11L, 11R is rotatably supported by a support shaft 15 extending in the fore and aft direction inside the upper frame 3 via an individual saddle arm 14L, 14R. The base end 21 of the left saddle arm 14L, through which the support shaft 15 is passed, is provided with a pair of retention notches 22 and 23 along the arcuate outer peripheral part thereof. A lock mechanism 25 is provided in a part immediately above the base end 21. The lock mechanism 25 includes a downwardly projecting key 25a which is resiliently urged downward.

When the left saddle part 11L is moved to the deployed position, the first notch 22 in the base end 21 thereof moves upward until the key 25a of the lock mechanism 25 is engaged by the first groove 22. When the left saddle part 11L is moved to the retracted position, the second notch 23 in the base end 21 thereof moves upward until the key 25a of the lock mechanism 25 is engaged by the second groove 23. Owing to this lock mechanism 25, the left saddle arm 14L is retained at the deployed position and the retracted position, respectively, so that the saddle 11*l* is held at each of these positions in a stable manner. The upper frame 3 is provided with a lock release mechanism (not shown in the drawings) that allows the key 25a of the lock mechanism 25 to be lifted against the spring force of the spring to enable the user to release the retained state of the saddle arm 14L.

The right saddle arm 14R is provided with a similar lock mechanism as that for the left saddle arm 14L. The right saddle arm 14R is connected to the left saddle arm 14L via a link mechanism not shown in the drawings so that the rotational movement of one of the saddle arms may be effected in synchronism with the rotational movement of the other saddle arm.

The saddle 11 for the vehicle 1 is not limited to that for seating the rider 12 as in the illustrated embodiment, but may also be configured to support any cargo that is to be transported by the user 12. In such a case, the shape of the saddle 11 may be selected as desired so as to suit the particular object to be supported.

The top wall of the upper frame 3 is fitted with a retractable grip handle 31 to allow the user to transport the vehicle 1. When not in use, the grip handle 31 is received in a grip handle storage portion 32 consisting of a recess formed in the top wall of the upper frame 3. When in use, the grip handle 31 is slid upward via front and rear legs 31a thereof until the grip handle 31 is raised above the upper frame 3 as indicated by the double-dot chain-dot lines in FIG. 1. The user is then able to lift and transport the vehicle 1, and prevent the vehicle 1 not in operation from falling by holding the grip handle 31.

As shown in FIG. 1, without regards to if the grip handle 31 is being used or stored, when the saddle 11 is retracted, the grip handle 31 is located above the saddle 11. Therefore, the user not riding the vehicle is enabled to grab the grip handle 31 with ease, and the support part can be preferentially grabbed by the user. As shown in FIGS. 2 and 3, the saddle 11 when in use overlies and covers a part (central part, in the illustrated embodiment) of the grip handle 31 in plan view. Therefore, when the saddle 11 is being used, the saddle 11 covers the grip handle 31 and prevents it from being used by the user.

Figure 4:
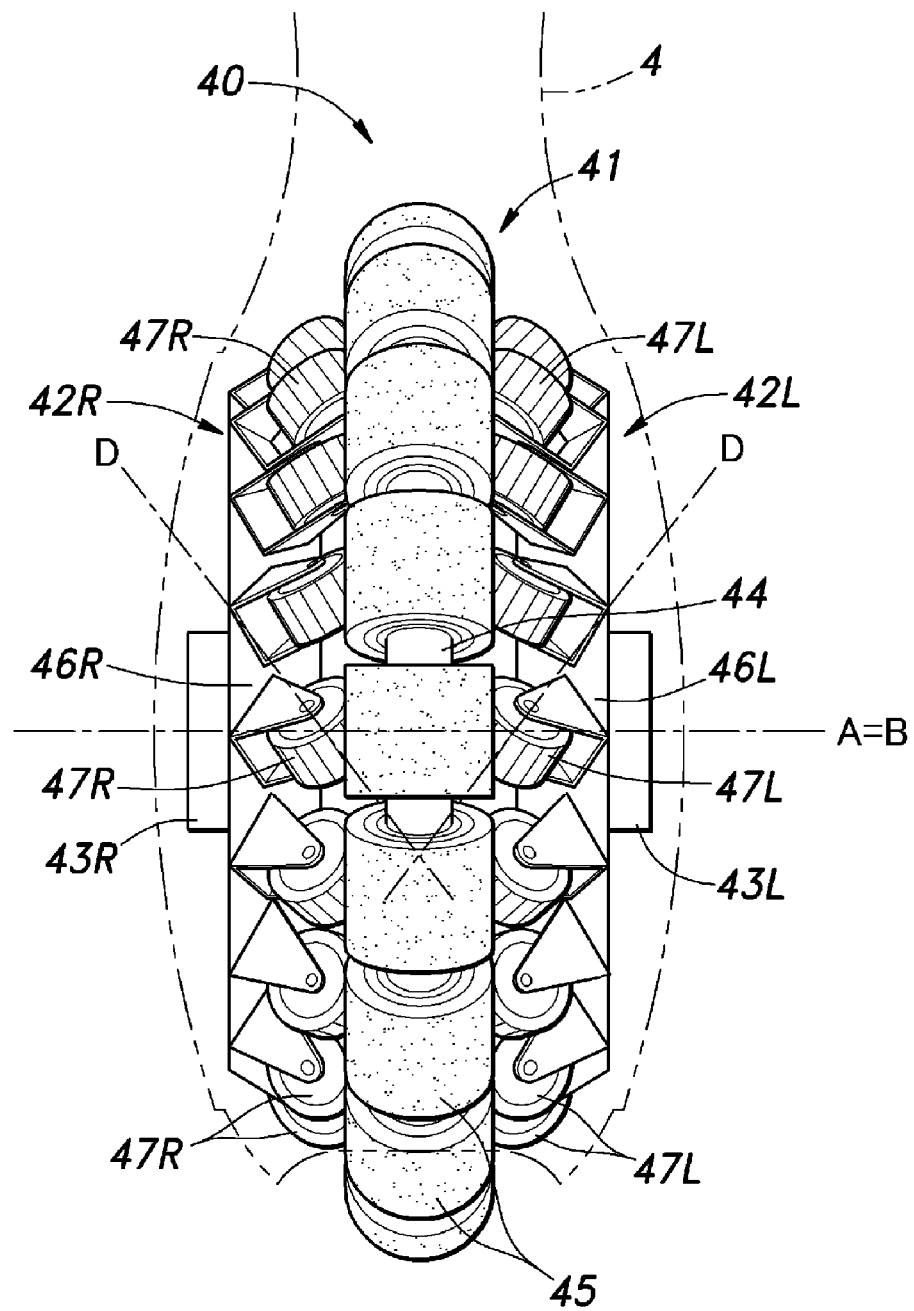
FIG. 4 is a front view of a propulsion unit of the inverted pendulum type vehicle.

The lower frame 4 forms the lower half of the housing 2, and supports a propulsion unit 40 used for propelling the vehicle 1 as shown in FIG. 4. The propulsion unit 40 essentially consists a main wheel 41, a pair of drive units 42L and 42R for driving the main wheel 41 from either side, and a pair of electric motors 43L and 43R for supplying power to the drive units 42L and 42R. The main wheel 41 comprises an annular member 44 given with an endless annular shape and a plurality of driven rollers 45 mounted on the annular member 44 so as to be rotatable around corresponding tangential axial lines. Each drive unit 42L, 42R comprises a frusto-conical drive disk 46L, 46R and a plurality of drive rollers 47L, 47R mounted on the tapered circumferential surface of the drive disk 46L, 46R at a regular angular interval. Each drive roller 47L, 47R is rotatable around a central axial line D thereof so that the circumferential surface thereof engages the circumferential surface of the corresponding driven roller 45. The central axial line D extends in an oblique direction which is neither perpendicular nor parallel to the central axial line A (wheel center) of the main wheel 41.

The main wheel 41 is held in position by being interposed between the two sets of drive rollers 47L and 47R, and is enabled to rotate around the central axial line B of the drive disks 46L and 46R which is coaxial to that of the main wheel 41 as the drive disks 46L and 46R are rotationally actuated by the electric motors 43L and 43R.

A pair of steps 51L and 51R are provided on either side of the lower frame 4 to support the feet of the user 12 from below as shown in FIG. 2. Each step 51L, 51R is moveable between a vertical retracted position (non-use position) shown in FIG. 1 and a horizontal deployed position (use position) shown in FIG. 2 by rotating around a pivot pin not shown in the drawings. Each step 51L, 51R is received in a step storage portion 52 consisting of a recess formed in the corresponding side wall of the lower frame 4 when in the vertical position.

The upper frame 3 and the lower frame 4 are connected to each other at the narrowed portion located in the vertically middle part of the housing 2. In this part of the housing 2 is placed a load sensor 60 which consist of a tri-axial force sensor configured to detect a force in the z-axis direction (vertical direction) and the moments around the x-axis and the y-axis. The load sensor 60 includes a main body 60a incorporated with a sensor base board and an input portion 60b extending upward from the main body 60a to receive the external force to be detected. The outer circumferential surface of the input portion 60b is formed with a thread. The main body 60a is supported by a sensor support member 61.

Figure 5:
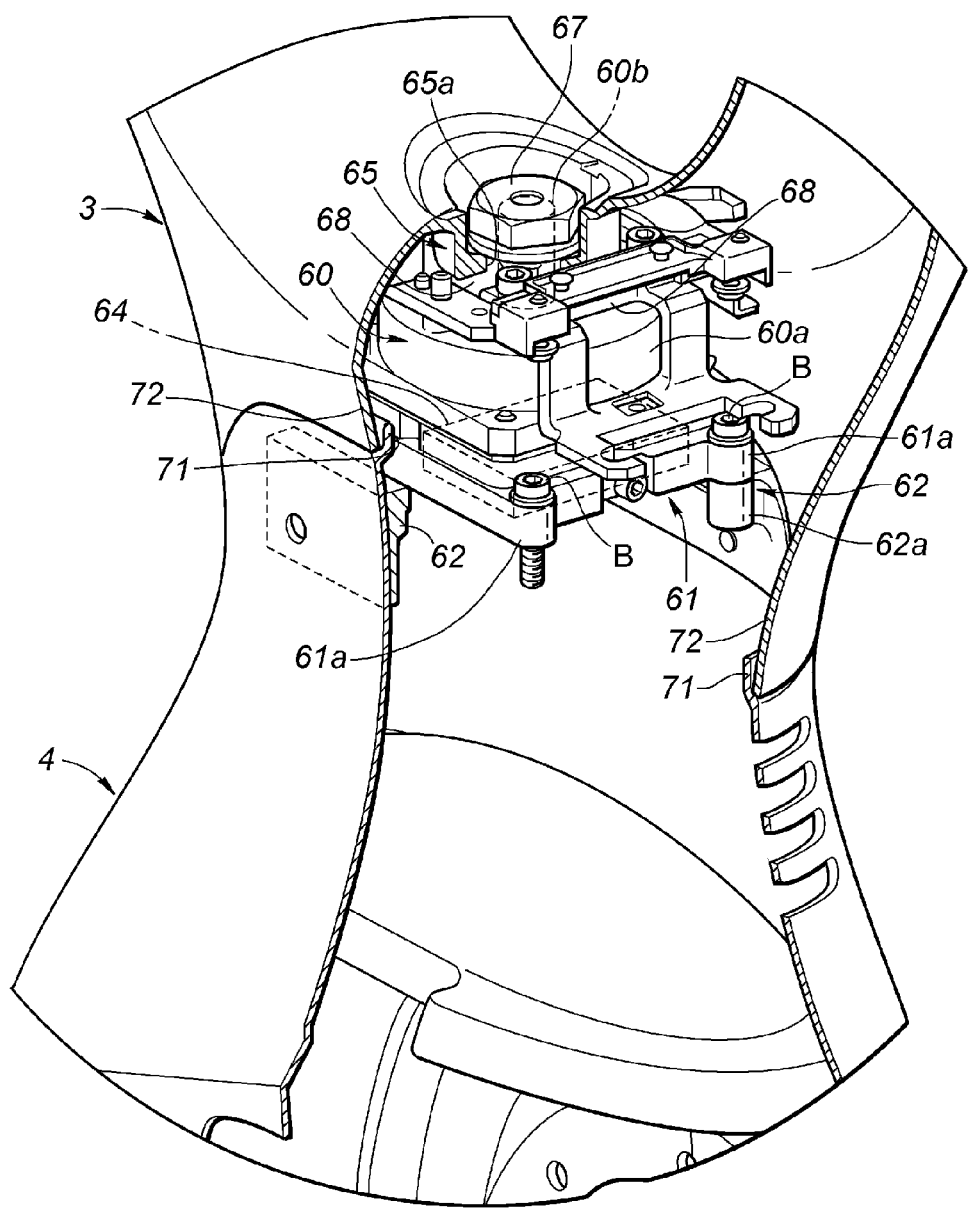
FIG. 5 is a partly broken away perspective view showing the structure for joining an upper frame to a lower frame in the inverted pendulum type vehicle.

The sensor support member 61 includes four connecting portions 61a each provided with a bolt receiving hole arranged along the outer periphery thereof (only the front two connecting portions are shown in FIG. 5). A mount member 62 is fixedly attached to the inner surface of each side wall of an upper part of the lower frame 4, and is provided with a pair of connecting portion 62a each having a bolt hole formed in parts thereof corresponding to the connecting portions 61a of the sensor support member 61. The sensor support member 61 can be attached to the lower frame 4 by passing a securing bolt B through each connecting portion 61a, and threading into the corresponding connecting portion 62a of the mount members 62. The sensor support member 61 houses a tilt sensor 64 consisting of a gyroscope or the like.

A part of the upper frame 3 under the saddle storage portion 13 is formed with a connecting recess 65 having a circular opening 65a centrally formed in the bottom part thereof. By fastening a nut member 67 threading with the free end of the input portion 60b of the load sensor 60, the connecting recess 65 is vertically clamped between the nut member 67 and a fixed member 68 which is threaded with the input portion 69b. The peripheral portion 71 defining the upper opening of the lower frame 4 is somewhat smaller than the peripheral portion 72 defining the lower opening of the upper frame in diameter so that the former peripheral portion 71 is loosely fitted into the latter peripheral portion 72.

In this vehicle 1, because the upper frame 3 is provided with the saddle 11 for supporting the load of the rider or the cargo, and is connected to the lower frame 4 via the input portion 60b of the load sensor 60, the upper frame 3 is not required to be provided with a load sensor for detecting the load on the saddle 11. Therefore, when the saddle is required to be replaced with another because of a design change or a failure or breakage in the saddle, it can be done with ease.

Figure 6:
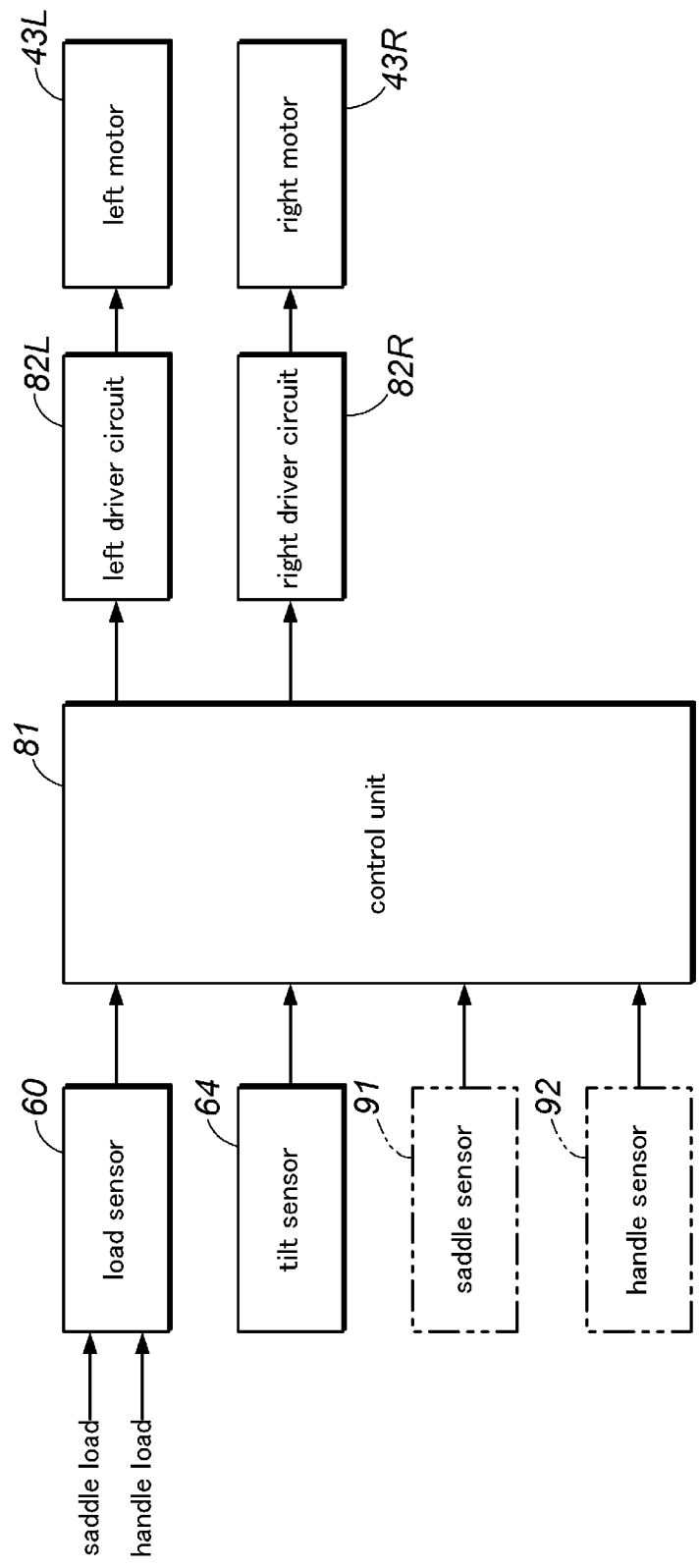
FIG. 6 is a block diagram showing an essential part of a control system for the inverted pendulum type vehicle.

An inverted pendulum control is performed for the main wheel 41 of this vehicle 1 according to the input from the tilt sensor 64 and the load sensor 60 so that the upper frame 3 and the lower frame 4 are both held in an upright position and the vehicle 1 can travel not only in the fore and aft and lateral directions but also in oblique directions as a unicycle vehicle. As shown in FIG. 6, the control system of the vehicle 1 comprises a control unit 81 including a microcomputer and motor drive circuits 82L and 82R for driving the electric motors 43L and 43R in addition to the load sensor 60 and the tilt sensor 64.

The control unit 81 acquires the detection result of the tilt sensor 64, and computes the tilt angle of the vehicle 1 with respect to the vertical direction and the change rate thereof from the detection result by performing a per se known computation process. The control unit 81 further determines the target values of the angular speed of the two electric motors 43L and 43R according to the computed tilt angle, the change rate thereof and the target value of the tilt angle of the vehicle 1, and performs a feedback control of the electric motors 43L and 43R based on the determined target values of the angular speeds thereof.

The control unit 81 further acquires the load detection value of the load sensor 60, and determines that a user is riding the vehicle 1 (or sitting on the saddle 11) depending on if the load detection value is greater than a prescribed threshold value. The control unit 81 is programmed for a plurality of operation modes, and selects a ride mode as the operation mode when a rider is detected. Depending on the position of the gravitational center of the vehicle 1 by taking into account the load of the rider detected by the load sensor 60, the control unit 81 sets the target value of the tilt angle of the vehicle 1 and other parameters for the inverted pendulum control for the ride mode. In this case, because the saddle 11 placed in the operational condition overlies the grip handle 31, and the grip handle 31 is thereby prevented from being operated by the user, the load acting on the load sensor 60 is limited to that applied to the saddle 11 so that the detection precision (in determining the presence of a rider) of the load sensor 60 can be improved, and the control of the vehicle 1 based on the detection result of the load sensor 60 can be performed in a favorable manner.

When the control unit 81 has detected that there is no rider on the vehicle, an upright mode is selected as the operation mode, and the control unit 81 sets the target value of the tilt angle of the vehicle 1 not loaded by a rider and other parameters for the inverted pendulum control for the upright mode.

When the control unit 81 has determined that there is no rider on the vehicle and that the rider is applying an upward load to the vehicle by gripping the grip handle 31 (or that the load detection value of the load sensor 60 is negative), a stop mode is selected as the operation mode, and the main wheel 41 is stopped from rotating to prevent the free rotation thereof. In this case, because the grip handle 31 is located above the saddle 11, and the user is prompted to operate the grip handle in a preferential manner, the upward load applied to the load sensor 60 is limited to that applied to the load sensor 60 via the grip handle 31 so that the detection precision of the load sensor 60 (in determining the upward load applied to the grip handle 31) can be improved, and the control of the vehicle 1 based on the detection result of the load sensor 60 can be performed in a favorable manner.

Furthermore, as shown in FIGS. 3 and 6, if a saddle sensor 91 is provided in the vehicle 1 so that the detection result thereof is made available for the control unit 81 to use, the process of determining if the saddle 11 is in the deployed position or in the retracted position can be performed in a highly accurate manner. Similarly, if a grip handle sensor 92 for determining if the grip handle 31 is in operative condition (in upwardly projecting condition) or not is provided in the vehicle 1 so that the detection result thereof is made available for the control unit 81 to use, the process of determining if the user is grabbing the grip handle 31 to apply an upward force thereto can be performed in a highly accurate manner. It also possible to provide an interlock so that when one of the saddle 11 and the grip handle 31 is in use, the other is locked in the retracted condition.

Although the present invention has been described in terms of a preferred embodiment thereof, it is obvious to a person skilled in the art that various alterations and modifications are possible without departing from the scope of the present invention which is set forth in the appended claims. For instance, the inverted pendulum type vehicle of the present invention may also be provided with a plurality of main wheels, instead of only a single main wheel. The support part for a user not riding the vehicle to support the vehicle is not limited by the grip handle of the illustrated embodiment, but may also consist of any other structure as long as the support part enables the user to support the vehicle with ease. The load that is applied by the user on the load supporting part of the upper frame is not limited by the seating load applied to the saddle, but may also consist of any other load that helps the user to be supported (such as the load that is produced in the case where the inverted pendulum type vehicle is used as a walking cane by the user to assist the user's effort to walk). It is also possible to provide a load sensor for detecting the load of the user in each of the steps as was the case with the prior art. The various components of the inverted pendulum type vehicle according to the present invention described above are not necessarily indispensable for the present invention, but may be omitted in a selective manner without departing from the spirit of the present invention.

1 inverted pendulum type vehicle
3 upper frame
4 lower frame
11L, 11R saddle (load supporting part)

12 user (rider)
13 saddle storage space
31 grip handle (support part)
40 propelling unit
41 main wheel
60 load sensor (force sensor)
60b input portion
64 tilt sensor
65 connecting recess
81 control unit

The invention claimed is:

1. An inverted pendulum type vehicle, comprising a lower frame supporting a propelling unit for the vehicle, and an upper frame detachably connected to the lower frame, wherein:
   the lower frame is provided with a force sensor including an input portion for receiving an external force; and
   the upper frame is provided with a load supporting part for supporting a load of a rider or a cargo and a support part for enabling a user not riding the vehicle to support the inverted pendulum type vehicle, the upper frame being connected to the lower frame via the input portion of the force sensor.

2. The inverted pendulum type vehicle according to claim 1, wherein the load supporting part is moveable between a deployed position that allows the load supporting part to be used and a retracted position that does not allow the load supporting part to be used, the load supporting part at least partly covering the support part when in the deployed position.

3. The inverted pendulum type vehicle according to claim 1, wherein the support part is located above the load supporting part when the load supporting part is in the retracted position.

* * * * *